United States Patent [19]

Nott et al.

[11] 4,125,460

[45] * Nov. 14, 1978

[54] MAGNETIC BENEFICIATION OF CLAYS UTILIZING MAGNETIC PARTICULATES

[75] Inventors: Alan J. Nott, Crantock nr. Newquay, England; William M. Price, Tennille, Ga.

[73] Assignee: Anglo-American Clays Corporation, Sandersville, Ga.

[*] Notice: The portion of the term of this patent subsequent to May 2, 1995, has been disclaimed.

[21] Appl. No.: 753,201

[22] Filed: Dec. 22, 1976

Related U.S. Application Data

[63] Continuation of Ser. No. 618,347, Oct. 1, 1975, Pat. No. 4,087,004.

[51] Int. Cl.² .............................................. B03C 1/00
[52] U.S. Cl. ........................................ 209/8; 209/10; 209/214
[58] Field of Search .................. 209/223 R, 5, 39.40, 209/214, 8.1, 10; 210/40, 222, 42; 252/62.56; 149/87

[56] References Cited

U.S. PATENT DOCUMENTS

| | | | |
|---|---|---|---|
| 933,717 | 9/1909 | Lockwood | 209/8.1 |
| 1,043,851 | 11/1912 | Lockwood | 209/8.1 |
| 2,352,324 | 7/1944 | Nubler | 209/39 X |
| 2,834,470 | 5/1958 | Jones | 210/222 |
| 2,954,122 | 9/1960 | Colburn | 209/214 X |
| 3,215,572 | 11/1965 | Papell | 149/87 X |
| 3,372,803 | 3/1968 | DeLisle | 209/214 X |
| 3,471,011 | 10/1969 | Ignnicell | 209/214 |
| 3,480,555 | 11/1969 | Jackson | 252/62.56 |
| 3,482,685 | 12/1969 | Malder | 209/5 |
| 3,627,678 | 12/1971 | Marston | 210/222 X |
| 3,670,337 | 6/1972 | Kolm | 210/42 |
| 3,806,449 | 4/1974 | Kaiser | 210/40 |
| 3,843,540 | 10/1974 | Reimers | 252/62.56 X |
| 3,853,983 | 12/1974 | Abercrombie | 209/214 X |
| 3,887,479 | 6/1975 | McClain | 252/62.56 X |
| 3,926,789 | 12/1975 | Shubert | 209/214 X |

FOREIGN PATENT DOCUMENTS 452,800  4/1975  U.S.S.R. ................................. 209/214

OTHER PUBLICATIONS

Intenation Science & Technology, Jul. '74, pp. 48-56 & 90.

Primary Examiner—Robert Halper
Attorney, Agent, or Firm—Weingram & Klauber

[57] ABSTRACT

A method for magnetically separating discoloring contaminants of low magnetic attractability from a crude kaolin clay containing said contaminants. A dispersed aqueous slurry of the clay is admixed with a finely divided magnetic particulate. The slurry is thereupon passed through a porous, ferromagnetic matrix in the presence of an applied magnetic field, whereby contaminants seeded by the particulate are separated from the slurry.

11 Claims, 5 Drawing Figures

MAGNETIC BENEFICIATION OF CLAYS UTILIZING MAGNETIC PARTICULATES

BACKGROUND OF INVENTION

This application is a continuation-in-part of our copending application, Ser. No. 618,347 now U.S. Pat. No. 4,087,004, filed Oct. 1, 1975, and entitled "Magnetic Beneficiation of Clays Utilizing Magnetic Particulates", which application is assigned to the same assignee as is the instant application.

This invention relates generally to methods for beneficiation of minerals, and more specifically relates to a method for improving the brightness of minerals such as kaolin clays, through the use of magnetic separation.

Naturally occurring minerals such as natural clays, carbonates, talc or so forth, frequently include discoloring contaminants in the form of iron and/or iron-stained titanium-based impurities. The present invention has particular applicability to natural clays, including kaolin clays, and it may be noted in this connection that the quantities of the aforementioned titanium-based discolorants are particularly significant in the case of the sedimentary kaolins of Georgia, where such impurities are commonly present as iron-stained anatase and rutile.

In the case of the kaolin clays and others of the minerals mentioned, it is often desired and sometimes imperative to refine the natural product and bring the brightness characteristics thereof to a level acceptable for paper coating and other applications. Various techniques have been used in the past to effect the removal of the aforementioned discoloring impurities. Thus, for example, hydrosulfites have been widely used for converting at least part of the iron-based (or "ferruginous") impurities to soluble form, which may then be removed from the clays.

Among the most effective methods for removing titaniferous impurities, including e.g. iron-stained anatase, are the well-known froth flotation techniques. According to such methods an aqueous suspension or slurry of the clay is formed, the pH of the slurry is raised to an alkaline value, for example, by the addition of ammonium hydroxide, and a collecting agent is added, as, for example, oleic acid. The slurry is then conditioned by agitating same for a relatively sustained period. A frothing agent, such as pine oil is then added to the conditioned slurry, after which air is passed through the slurry in a froth flotation cell to effect separation of the impurities.

Within recent years it has further been demonstrated, that high intensity magnetic separation techniques may be utilized for removing certain of the aforementioned impurities, including titaniferous impurities, and certain ferruginous matter. Anatase, for example, and certain other paramagnetic minerals, have been found to respond to high intensity magnetic fields. Thus, for example, U.S. Pat. No. 3,471,011 to Joseph Iannicelli et al., discloses that clay slurries may be beneficiated by retention for a period of from about 30 seconds to 8 minutes in a magnetic field of 8,500 Gauss or higher. Reference may also be made to U.S. Pat. No. 3,676,337 to Henry H. Kolm, disclosing a process for treating mineral slurries by passing same through a steel wool matrix in the presence of a background field of at least 12,000 Gauss. Various apparatus, such as that disclosed in Marston, U.S. Pat. No. 3,627,678, may be utilized in carrying out the Kolm processes. In this latter instance the slurry is thus passed through a canister, which contains a stainless steel or similar filamentry ferromagnetic matrix, while a high intensity magnetic field is impressed on the matrix by enveloping coils.

While the use of magnetic separation, as outlined in the foregoing paragraph, has found a high degree of acceptance in certain mineral beneficiation technology — most notably in the brightening of kaolins — it has generally been believed up until the present time, that such technology was either incapable of producing brightness improvements attainable by the use of the aforementioned flotation techniques, or (by virtue of requirement for high intensity fields) was not economically practical where major brightness increases were desired. In the foregoing regard it should be especially noted that field intensity levels of the low to intermediate range have not in the past been deemed of substantial value for use in brightening kaolins or the like to commercially acceptable levels.

In accordance with the foregoing, it may be regarded as an object of the present invention, to provide a method for magnetic separation of discoloring contaminants from mineral slurries, such as kaolin slurries, which method enables brightness improvements previously unattainable through magnetic separation processes.

It is a further object of the present invention, to provide a method for magnetically beneficiating mineral slurries such as kaolins, which method yields brightness improvements at sufficiently high levels to obviate any requirements for flotation treatments.

It is a yet further object of the present invention, to provide a method for magnetic separation of discoloring contaminants from mineral slurries, which is based upon the use of particulate magnetic activating agents, of a type which are producible at low costs, and which have little or no detrimental impact upon the environment.

It is a still further object of the invention, to provide a method for magnetic separation of discoloring contaminants from kaolin slurries or the like, which enables the use of lower field intensities than have heretofore been deemed appropriate or feasible for such purposes.

It is a yet further object of the invention, to provide a method for magnetic separation of discoloring contaminants from kaolin slurries or the like, which may be utilized with existing magnetic separation apparatus, and which vastly increases the performance capabilities of such devices.

SUMMARY OF INVENTION

Now in accordance with the present invention, the foregoing objects and others as will become apparent in the course of the ensuing specification, are achieved in a method wherein a dispersed aqueous slurry of the crude mineral is admixed with a magnetic particulate, which particulate is thus dispersed throughout the slurry so as to effectively seed the slurry. Thereupon, the seeded slurry is subjected to a magnetic separation as, for example, by passing same through apparatus of the type cited in the aforementioned Marston patent, whereby contaminants seeded by the particulate are separated from the slurry — along with excess particulate (i.e. particulate not physically associated with contaminants) and additional unseeded contaminants.

Following treatment by the magnetic field, the said slurry, e.g. after emerging from the magnetic separator, is flocculated, and then subjected to a conventional leaching step, typically with sodium hydrosulfite. The leached slurry may thereafter be washed free of residual leaching reagents and, if desired, dewatered.

As will become further apparent in connection with the ensuing Examples, the leaching step in the present invention is of particular significance, in that the magnetic particulates are in many instances of very dark coloration. In consequence, the product emerging from the magnetic separator, despite the removal of vast quantities of the original discolorants, may yet display relatively unacceptable brightness. However, the discoloration arising from the remnants of the magnetic seeding particulate is due to iron compounds which are readily removed by leaching, whereas the displaced titaniferous contaminants are of a type which are relatively unresponsive to conventional leaching.

It will, of course, be understood that where apparatus of the aforementioned Marston or similar types are utilized, the porous ferromagnetic collection matrix over a period of time will become saturated with the elements removed from the slurry, i.e. with the magnetic particulates and the clay contaminants removed therewith. As is well-known in the present art, the matrices are therefore from time to time subjected to conventional flushing operations with the field removed or extinguished.

A preferable magnetic particulate for use with the processes of the invention, may comprise a particulate of ferrosoferric oxide particles, wherein at least 50% by weight of the particles are of sub-micron size, which particulate is prepared as the product of co-precipitation of iron (III) with iron (II) salts by an excess of a relatively strong base. Preparation of a particulate of this type has been described as one aspect of a communication of W. C. Elmore, entitled "Ferromagnetic Colloid for Studying Magnetic Structures" in *Physical Review* 54, 309 (1938). Although not as effective in the present application, a natural ferroso-ferric oxide, such as finely ground magnetite having a size distribution such that at least 50% by weight are less than 30 microns E.S.D., may also be used in practice of the invention. Similarly, other finely divided ferrimagnetic materials may be used as activators including cubic ferrites such as $NiFe_2O_4$ and $CoFe_2O_4$; gamma ferric oxide, and more generally the magnetic ferrites represented by the general formula $MO.Fe_2O_3$ where M is a divalent metal ion such as Mn, Ni, Fe, Co, Mg, etc.

A principal consequence of the present invention is that the performance levels of magnetic separation apparatus are so vastly augmented that one may elect to trade-off flow rates through a given apparatus (and thereby retention time in the field) against field intensity, to an extent heretofore not deemed practical. The magnetic field to which the slurry is subjected, may thus, in the practice of the invention, be dropped to at least as low as 0.5 kilogauss — and yet provide brightening of the treated mineral to fully acceptable levels, i.e. to levels previously attainable only at intensities in the range of from about 12 to 15 kilogauss or higher.

In general retention times are adjusted to the field intensities utilized and the brightening required. For example, at a field intensity of 5 kilogauss use of the invention with the aforementioned Marston-type of apparatus yields an acceptable brightening increase with retention times as low as 15 seconds. The present invention indeed makes possible "trade-offs" in retention time vis-a-vis field intensity to a degree heretofore unknown in the art. The aforementioned Marston-type of apparatus is designed for (and has in the past been operated) at about 15 to 22 kilogauss. With these last levels of field intensities typical retention times in the practice of the present invention are of the order of 15 to 80 seconds. Within the limits of the technology (and of economics), higher fields may also be used with the invention, e.g. up to 60 kilogauss, or higher.

DESCRIPTION OF PREFERRED EMBODIMENT

Figure 1:
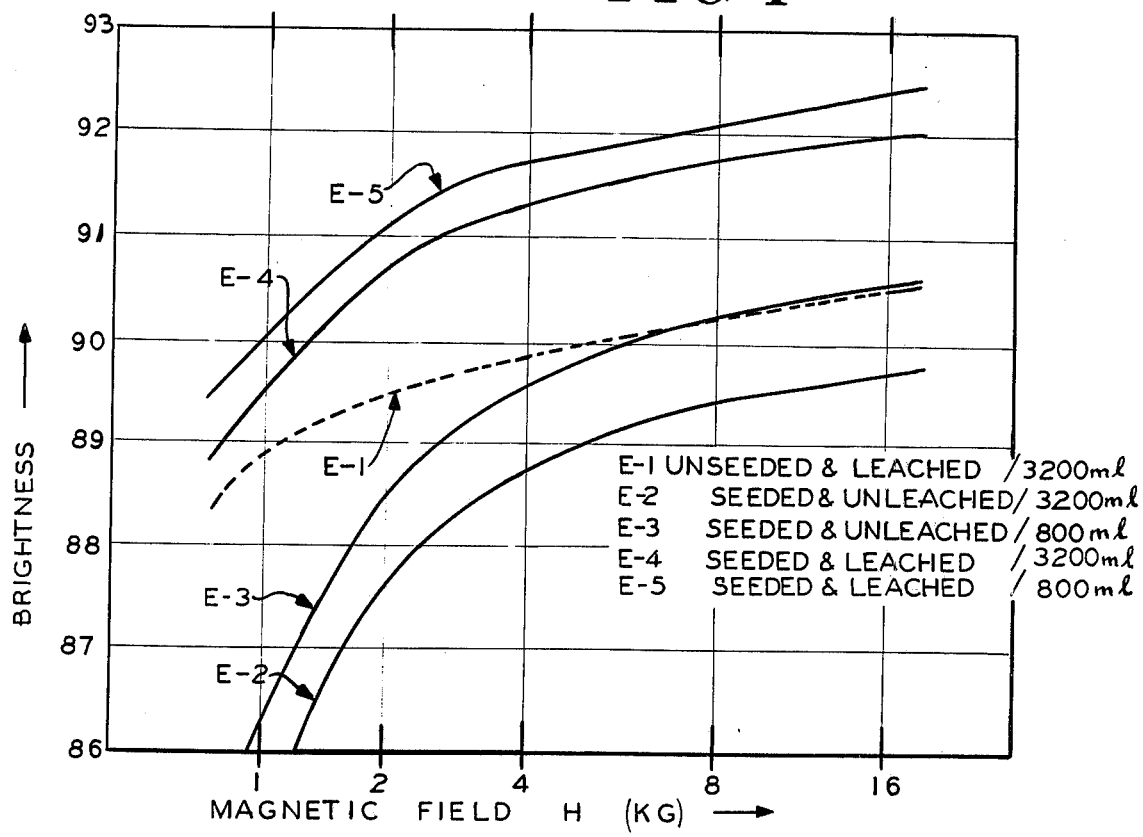
FIG. 1 is a graph depicting brightness characteristics as a function of applied magnetic field for a representative clay subjected to magnetic separation under various treatment conditions, including by application of the present invention.

The manner in which the present invention is practiced, is best understood by consideration of the Examples now to be set forth, which further will render clear to those familiar with the present art, the striking brightness improvements achieved by the practice of the present methodology.

EXAMPLE I

In order initially to establish control data for demonstrating the efficacy of the present invention, four groups of soft, cream Georgia kaolin clay samples, were beneficiated: (1) by leaching alone; (2) by use of flotation alone; (3) by prior art magnetic separation; and (4) by a prior art combined flotation and magnetic separation treatment. Two of the said clay groups (Clays A and B) were of a "coarse" variety; the other two (Clays C and D) were "fine" clays. In each instance the crude sample was initially blunged. Specifically, an aqueous, alkaline dispersion of the crude clay was formed (pH adjusted to about 7 to 10 with ammonium hydroxide), the blunging being effected in the presence of a small amount of a dispersant such as sodium silicate, and the amount of energy dissipated being approximately 10 HP-hr/ton of solids. The blunged sample was then subjected to further treatment — in accordance with the test schedule. Effectiveness of the various beneficiation treatment were gauged by determining the resultant brightness for the 90% less than 2 micron fraction of the treated sample. The resultant data is set forth in Table I below, where in each instance the numerical brightness values are the so-called "G. E. Brightness" obtained according to the standard specification established by TAPPI procedure T-646m-54.

Table I

| Clay | Process | TiO₂ % | Fe₂O₃ % | Brightness Product | Leaching (8#) |
|---|---|---|---|---|---|
| Clay A | Blunged | 1.77 | — | 84.5 | 86.8 |
|  | Float | 0.50 | — | 89.5 | 91.6 |
|  | Magnet | 1.29 | — | 87.9 | 90.0 |
|  | Float + Magnet | 0.46 | — | 90.6 | 92.0 |
| Clay B | Blunged | 1.63 | 0.24 | 77.0 | 84.1 |
|  | Float | 0.42 | 0.24 | 88.0 | 91.2 |
|  | Magnet | 0.99 | 0.18 | 84.3 | 87.9 |
|  | Float + Magnet | 0.42 | 0.18 | 89.8 | 91.7 |
| Clay C | Blunged | 1.45 | — | 82.3 | 87.2 |
|  | Float | 0.17 | — | 87.8 | 90.5 |
|  | Magnet | 0.77 | — | 87.3 | 90.2 |
|  | Float + Magnet | 0.03 | — | 90.1 | 91.9 |
| Clay D | Blunged | 1.47 | 1.10 | 83.1 | 88.0 |
|  | Float | 0.39 | 1.18 | 86.3 | 90.8 |
|  | Magnet | 1.02 | 0.90 | 87.5 | 89.6 |
|  | Float + Magnet | 0.35 | 0.91 | 90.0 | 91.7 |

In each instance in Table I, brightness data is set forth for the treated sample both before ("product"), and after leaching with sodium hydrosulfite at addition levels of 8 lbs/ton of solids. Both the TiO₂ and Fe₂O₃ contents — as is customary in this art — were determined prior to leaching.

The flotation data in Table I was generated by subjecting the samples to conventional flotation treatment. This was effected by blunging and conditioning such samples with oleic acid as a collector agent, in quantities in the range of from about 2 to 4 lbs/ton. The solids content during such blunging and conditioning was 60%. The amount of energy dissipated during blunging and conditioning was from about 40 to 50 HP-hr/ton solids. The blunged and conditioned slurry, after addition of a frothing agent as, for example, pine oil, was then subjected to a conventional treatment in a froth flotation cell, i.e. air was passed through the slurry in said cell to effect separation of impurities from the clay.

The data of Table I identified as "magnet" was yielded by subjecting the samples to a prior art-type of magnetic separation. In particular slurry samples that had previously been blunged, were passed at about 30% solids, through a steel-wool matrix (7.5% packing) in an apparatus of the general type depicted in the aforementioned Marston U.S. Pat. No. 3,627,678. the average field intensity during such treatment was about 15 kilogauss, and the retention time in the field was approximately 1.2 minutes. These conditions approximate to a 10 ton/hr. production rate for an 84 inch magnet (I.D.) at 30% solids — and are deemed relativly optimal.

The data of Table I identified as "float + magnet" was yielded by subjecting the samples to sequential flotation and magnetic separation — each said step being effected under the same conditions as just outlined. It may be noted in this connection that such a sequential process has been disclosed in the present co-inventor Alan J. Nott's patent application Ser. No. 513,154 filed Oct. 8, 1974, wherein it is taught that the initial flotation treatment enables removal of high intensity magnetic separation of impurities not otherwise amenable to the magnetic separation. The brightness increase and TiO₂ reduction brought about by this conjunctive treatment, are in fact the most superior results yielded in the tabulated data of Table I.

A preferred magnetic seeding particulate for use in the processes of the present invention is a synthesized ferroso-ferric oxide which is prepared by coprecipitating iron (III) and iron (II) ions from an aqueous solution is a desired molar ratio, by neutralization with an excess of a relatively strong base, such as ammonium or sodium hydroxide. The size and size distribution of the resultant particulate varies somewhat according to the specifics of the reaction conditions; but in general the particulate has a size distribution such that at least 50% by weight of the particles have an equivalent diameter less than 1 micron — as determined by Sedigraph analysis. ("Sedigraph" is a trademark for size analysis instruments manufactured by Micromeritics Instrument Corp., of Norcross, Ga.)

The cited reaction results in an intense black colored ferrimagnetic precipitate. The precipitate, as thus far described, is dispersed in the aqueous carrier and thus defines an aqueous particulate. Since such particulate is unpeptized, it will gradually settle if permitted to stand. The molar proportions of the two iron species can be mixed to yield products of varying magnetic saturation values. In a preferred compositional range the ferrosoferric oxide thus prepared, will have an iron (III) to iron (II) ratio from about 1 to 2.5; with a yet more optimal range having a ratio of from about 1.5 to 2.0.

EXAMPLE II

A magnetic seeding particulate for use in the processes of the invention, was prepared by weighing 12.8 g of FeCl₂.4H₂O and 18.6g of FeCl₃ (anhydrous) in a 400 ml flask. 200 ml of deionized water were added, with good stirring. With vigorous stirring 61.2 ml of NH₄OH (28% solution) were thereupon slowly added. This yielded approximately 264 ml of magnetic seeding particulate "solution". Dose rates in many of the following Examples are expressed in ml of such an aqueous magnetic particulate added to a clay slurry containing 4 lb. dry weight of clay. For example, a dose rate of 100 ml/4 lb. clay corresponds to 50 liters/ton or 13.2 U.S. gallons/ton. If it is assumed that all the iron in the salt solution is converted to Fe₃O₄, then 264 ml of the aqueous magnetic particulate will contain 13.2 g Fe₃O₄. Therefore a dose rate of 100 ml/4 lb. clay will correspond to 5.0g/4 lbs. clay, to 2.5 Kg Fe₃O₄ per ton of clay, or 4.5 lbs. Fe₃O₄ per ton of clay.

EXAMPLE III

The aqueous magnetic seeding particulate of Example II was added to and thoroughly mixed with aqueous slurries (30% solids) of kaolin clay samples of the type identified in Example I as "Clay A". The resultant "seeded" slurry was then passed through a magnetic separating apparatus of the type cited in Example I. The average field intensity at the steel wool matrix utilized was 15 kilogauss. Various pumping rates were employed (yielding varying retention times in the field); and varying dosage rates of the magnetic seeding material were employed. The resultant data is set forth in Table II below:

Table II

| Procedure | Dose Rate ml. | Pump Setting | TiO₂ (%) | Fe₂O₃ (%) | Brightness Product | Leached (8#/ton) |
|---|---|---|---|---|---|---|
| Flotation | 0 | — | 0.42 | 1.12 | 86.6 | 90.8 |
|  | 0 | 10 | — | — | 88.1 | 90.4 |
| Magnet | 0 | 20 | — | — | 88.2 | 90.1 |
|  | 0 | 30 | — | — | 87.2 | 89.8 |
|  | 0 | 10 | 0.29 | 0.93 | 90.1 | 92.0 |
| Float + Magnet | 0 | 20 | 0.42 | 0.78 | 89.7 | 92.0 |
|  | 0 | 30 | 0.35 | 0.89 | 89.3 | 92.0 |
| Magnet + Seeding Particulate | 25 ml | 10 | 0.93 | 0.98 | 87.5 | 90.2 |
|  |  | 20 | 1.05 | 0.91 | 86.6 | 90.0 |
|  |  | 30 | 1.12 | 0.93 | 86.1 | 89.8 |
|  | 50 ml | 10 | 1.05 | 0.86 | 87.8 | 90.6 |
|  |  | 20 | 0.97 | 0.91 | 86.8 | 90.0 |
|  |  | 30 | 1.02 | 0.95 | 86.0 | 89.8 |

Table II-continued

| Procedure | Dose Rate ml. | Pump Setting | TiO$_2$ (%) | Fe$_2$O$_3$ (%) | Brightness Product | Brightness Leached (8#/ton) |
|---|---|---|---|---|---|---|
| | 100 ml | 10 | 0.48 | 0.94 | 86.7 | 91.8 |
| | | 20 | 0.48 | 0.88 | 85.7 | 91.4 |
| | | 30 | 0.66 | 1.03 | 83.3 | 91.2 |
| | 150 ml | 10 | 0.55 | 1.09 | 81.2 | 91.5 |
| | | 20 | 0.51 | 1.09 | 80.9 | 91.6 |
| | | 30 | 0.45 | 1.18 | 80.9 | 91.2 |

The brightness data appearing in Table II are all taken (as heretofore described) for the 90% less than 2 micron fraction of the treated sample. The pump settings, identified as "10", "20" and "30", correspond respectively to approximate field retention times as follows:

Table III

| Pump Setting | Retention Time (secs.) |
|---|---|
| 10 | 72 |
| 20 | 48 |
| 30 | 24 |

On comparing the data of Table II appearing to the right of the procedure identified as "Magnet + Seeding Particulate" to the control results appearing immediately thereabove (and also to the control data of Table I), it will be evident that the leached brightness levels achieved (especially when the relatively optimized doseage levels around 100 ml are considered), much exceeds the brightness improvements yielded by prior art magnetic separation alone. The improvement in brightness at the more optimal levels of the seeding composition, also clearly exceeds the result obtained by prior art flotation; and the prior art flotation plus magnetic separation techniques provide only marginally better results than the application of the inventive method.

There is an average of about 0.4 brightness units difference between results obtained with pump settings 10 (72 sec. retention) and 30 (24 sec. retention). The low retention time data is particularly noteworthy — in that the 24 second retention time is well below that previously thought necessary to obtain even useful brightness improvement, much less improvements exceeding those yielded by flotation.

It may be noted in Table II that the "Magnet + Seeding Particulate" brightness are in general lower for the "Product" taken from the magnetic separator than the "Products" of the various other treatment process — i.e. the "Product" is of lower brightness until leaching is effected. This result obtains because of the intense dark discoloration of the magnetic particulate. Basically the individual particles added by the invention (as will be further discussed hereinbelow) serve to seed impurities such as iron-stained TiO$_2$. While large quantities of such impurities are thus removed (together with the seeding particles) as the seeded slurry passes through the separator, the "Product" (as it emerges from the separator) may actually show an increase in Fe$_2$O$_3$ content and a darkening in color — in that the amount of iron added by the seeding material, can equal or exceed the amount of "bound" iron removed with the TiO$_2$ and other impurities. However, the seeding material is, of course, (unlike the TiO$_2$) readily removable by leaching. The hypothesis just stated is fully supported by the data of Table II, as well as by the data which will be set forth in connection with the further Examples hereinbelow. Thus e.g. it will be observed (by comparing Table I) that the TiO$_2$ content of the samples treated by the present invention, are about 40% lower than that of corresponding samples subjected to prior art magnetic separation.

The precise mechanisms which enable the results yielded by the present invention, are at present only imperfectly understood. Experimental data gathered by use of electron microscopy techniques, however, appears to support a hypothesis that the minute particles constituting the seeding particulate become selectively attached to certain impurities in the clay, notably to titania; and that the attachment process is a surface phenomenon occasioned by electric fields acting at the titania-seeding particle interface. The attachment or surface association, appears at least in good part to occur prior to application of the magnetic field, and hence is not dependent on such field — although additional association between seeding particles and contaminants may be induced by the later applied field, which then acts (with augmented effect) upon the combined entities to effect the desired separation. It should therefore be understood that the term "seeded contaminants" when used herein refers to titania, titaniferous impurities or the like which have become physically associated with the "seeding" particles — e.g. by the surface association phenomenon mentioned. Whether such "seeded" state has arisen from association occurring prior to or during imposition of the applied magnetic field is not relevant to the use of the term.

It may also be noted in connection with the foregoing analysis, that it has from time to time been observed in the prior art that certain additives possessing ferromagnetic or ferrimagnetic properties can be useful in the course of performing magnetic separation. A noteworthy example may be found in Hubler, U.S. Pat. No. 2,352,324, a disclosure relating to the beneficiation of feldspathic ores. Hubler, as one aspect of this beneficiation process, may include a wet magnetic separation step. He notes in that connection that conditioning of the ore in the presence of certain fatty acid reagents such as oleic acid, benefits the magnetic separation process; and he indicates that the improvement comes about because the fatty acid reagent coats the particulate contaminants so as to enable magnetite which is present in the ore, to then become attached to and coat the impurities.

Teachings of the foregoing type however, quite distinct from the present invention, wherein no fatty acid reagents or the like are used. The mechanisms of the present invention are indeed quite distinct from those that may have occurred in art such as Hubler. This is possibly due to the vast differential in particle size for the additives, as well as to the differences in the nature of the particulate compositions. The mechanism in the present invention is thus not believed to involve a coating of impurities with the magnetic particulate via intermediates such as fatty acid reagents — or via the use of other intermediates such as oils, adhesives or so forth.

EXAMPLE IV

Preparation of magnetic particulates of the general type described in Example II is also reported in Reimers and Khalafalla U.S. Pat. No. 3,843,540, where, however, the ferroso-ferric oxide precipitate is primarily deemed of interest as an intermediate product in the formation of the ferrofluids otherwise disclosed. The said investigators state that the precipitate may be produced using any relatively strong base, but that use of ammonium hydroxide is very much preferred. It appears that ammonium hydroxide is so preferred, because in the subsequent preparation of the ferrofluids sodium oleate is formed, which although soluble in water, will not decompose at low to moderate temperature as does ammonium oleate. Hence magnetic particles having an absorbed oleic acid coating are formed, which do not prevent the formation of a ferrofluid. This reasoning does not, of course, apply to the process set forth e.g. in Example III herein, where the ferro-so-ferric oxide is not rendered into a ferrofluid.

Nonetheless the present Example illustrates that generally superior results are achieved with the present invention where the ferroso-ferric oxide is prepared via use of ammonium hydroxide. In particular magnetic seeding particulates were prepared by dissolving 1.3g of $FeCl_2.4H_2O$ and 3.0g of $FeCl_3.6H_2O$ in distilled water, and adding 3.6g of sodium hydroxide dissolved in water or an equivalent of ammonium hydroxide (28% solution).

Seeding materials prepared as above, were then thoroughly mixed with 50% solids clay slurries containing 4 lb. dry clay of the aforementioned "Clay A" type, and the slurries were subjected to magnetic separation utilizing a steel wool matrix, a magnetic field intensity of 15 kilogauss and a pump setting of 10 (72 sec. retention time). The resultant brightness, $TiO_2$ and $Fe_2O_3$ contents are set forth in Table IV below, from which it will be evident that somewhat superior results are indeed yielded where the ammonium hydroxide is employed:

Table IV

| Seed | Base | $TiO_2$ (%) | $Fe_2O_3$ (%) | Brightness Product | Brightness Leached 8#/ton |
|---|---|---|---|---|---|
| Aqueous Ferroso-ferric oxide particulate | NaOH | 0.03 | 0.18 | 86.2 | 92.0 |
| | $NH_4OH$ | 0.03 | 0.25 | 90.6 | 92.5 |

It has previously been indicated that the aqueous, unpeptized particulate of Example II is a preferable material for use in the present invention.

A principal reason for this is, of course, the superior brightening achieved via the said aqueous particulates — this aspect of the invention will become further evident in the ensuing Examples. The cost of these magnetic activating materials is also low, enabling economical processing. To improve the economics of the process even further, one may utilize lower quality starting materials for preparing the particulates of Example II; e.g. the sources of iron salts may comprise waste pickling liquors from steel mills, or similar industrial waste products.

EXAMPLE V

The magnetic seeding particulates of the present invention appear, in general, to yield superior results when used in a freshly-prepared state. The last result is believed to obtain because the said aqueous materials — in that they are not dispersed as are true colloids — are relatively subject to change in size distribution as a function of time, i.e. by agglomeration, etc.

In order to demonstrate the foregoing factors, an aqueous particulate composition was prepared in accordance with Example II. The particulate was added to a kaolin clay slurry at a doseage rate of 100 ml per 4 pounds of dry clay. The said particulate was specifically added to the clay slurry after the following times: (i) immediately upon preparation; and after (ii) 4 hours; (iii) 8 hours; (iv) 20 hours and (v) 32 hours. The treated slurries were then passed through magnetic separating apparatus as in Example I at 20% solids, utilizing a pump setting of 10 (corresponding to retention time of 72 seconds), with the field intensity at the steel wool matrix being 15 kilogauss. $TiO_2$ and $Fe_2O_3$ were determined on dry samples after the separation, and before leaching. Brightnesses were measured for 0, 4, 6 and 8 lbs/ton leach level. The resultant data is set forth in Table V hereinbelow:

Table V

| Activator | Time (hours) | $TiO_2$ | $Fe_2O_3$ | Product Brightness | Leached Brightness 4#/ton | Leached Brightness 6#/ton | Leached Brightness 8#/ton |
|---|---|---|---|---|---|---|---|
| None | — | 1.09 | 1.05 | 87.3 | 90.1 | 90.2 | 90.2 |
| Aqueous Magnetic Particulate | 0 | 0.61 | 1.05 | 86.6 | 91.0 | 91.5 | 91.5 |
| | 4 | | | 87.2 | 89.9 | 90.5 | 90.6 |
| | 8 | 1.09 | 0.97 | 87.6 | 90.5 | 90.5 | 90.5 |
| | 20 | 0.90 | 0.93 | 87.5 | 90.5 | 90.5 | 90.5 |
| | 32 | 0.90 | 0.97 | 87.0 | 90.6 | 90.6 | 90.6 |

The data tabulated in Table V establishes that the freshly prepared particulate gives the best results. Product brightness, it will be noted, is in some cases lower than product brightness where no seeding particulate is employed. As previously discussed in connection with Example III, this result obtains because some of the intensity colored black $Fe_3O_4$ passes through the magnet — but the drop in brightness is recovered upon leaching, i.e. the excess $Fe_3O_4$ is then reduced by the hydrosulfite leaching reagent.

EXAMPLE VI

Samples of the simplified magnetic seeding particulate of the type utilized in Example III, were subjected to particle size distribution analysis by means of a Sedigraph Particle Size Analyzer. It was found that when the freshly prepared ferrosoferric oxide was diluted with the deionized water and analyzed, the resultant particle size distribution was bimodal, and suggested that only about 25% of the particles had an equivalent spherical diameter (E.S.D.) of less than 1 microns. When, however, a small amount (5 to 10 ml) of Dispex (the latter being a trade name of Allied Colloids, Great Britain, for a water soluble salt of a polyacrylic or a polymethacrylic acid) was added to the composition, and the latter then homogenized in a Waring blender, the resultant P.S.D. (particle size distribution) curve indicated that approximately 50% by weight of the particles were below 1 micron E.S.D., with only a fraction of the particles being over 10 microns. Furthermore this second size distribution determination was completely reproducible. It has been assumed that size determination when thus made in the presence of the dispersing agent, reflects an accurate Sedigraph analysis of the particulate — since it is believed that without the dispersing agent, agglomeration of particles and other extraneous factors, prevent an accurate determination of size distribution.

The P.S.D. of the same particulate — which had, however, been aged for 16 hours — was then determined, again in the presence of small quantities of Dispex. It appeared from this second analysis that somewhat under 35% of the particles had an E.S.D. of less than 1 micron; with the maximum particle size cutting off at about 10 microns E.S.D. This indicated that after the time duration cited, a certain amount of coagulation had occurred.

A further series of tests were then evaluated, wherein the Dispex was added immediately after addition of ammonium hydroxide, followed by a step of homogenizing in a high speed mixer. In this instance the P.S.D. was such that 70% by weight of particles had an E.S.D. of less than 1 micron. Again, all determinations were made by Sedigraph analysis.

EXAMPLE VII

In the present Example, samples of the "Clay D" kaolin clays were treated with widely varying doseage rates of the magnetic seeding particulates of Example II. The treated samples were then subjected to magnetic separation by the same procedure, and using the type of apparatus, set forth in Example III. In each instance the field intensity utilized was 15 kilogauss, a pump setting of 10 (corresponding to 72 seconds retention time), and a steel wool matrix with 7.5% packing was employed.

In each instance product brightness was determined for the samples from the magnetic separator ("product"), and leached brightnesses at various level of leach addition were determined. Similarly the $TiO_2$ and $Fe_2O_3$ contents were determined for the treated samples. For purposes of comparison, several tests were also run, utilizing prior art flotation alone, prior art flotation plus magnetic separation, blunging alone, and prior art magnetic separation alone. In all instances the course of treatment for the prior art techniques, is as set forth in Example I herein. The results yielded are set forth in Table VI below:

Table VI

| Method | Aqueous Mag. Part. (ml/4# clay) | Product Brightness | Leached Brightness 4#/ton | 6#/ton | 8#/ton | $TiO_2$ % | $Fe_2O_3$ % |
|---|---|---|---|---|---|---|---|
| Float alone | | 86.3 | 90.6 | 90.8 | 90.8 | 0.39 | 1.18 |
| Float + Magnet | | 90.0 | 91.7 | 91.7 | 91.7 | 0.35 | 0.91 |
| Blunger alone | | 83.1 | 88.0 | 88.0 | 88.0 | 1.47 | 1.10 |
| Magnet alone | | 87.5 | 89.5 | 89.6 | 89.6 | 1.02 | 0.90 |
| Magnet + Magnetic Particulate | 25 | 87.0 | 89.5 | 89.5 | 89.5 | 0.90 | 0.93 |
| " | 50 | 87.3 | 89.8 | 89.8 | 89.8 | 0.87 | 1.01 |
| " | 75 | 87.5 | 89.9 | 90.0 | 90.0 | 0.81 | 0.89 |
| " | 100 | 86.8 | 89.5 | 89.5 | 89.5 | 0.99 | 1.01 |
| " | 100* | 89.0 | 90.5 | 90.6 | 90.8 | 0.70 | 0.94 |
| " | 125 | 85.0 | 87.3 | 90.2 | 90.3 | 0.78 | 1.01 |
| " | 150 | 85.4 | 89.5 | 89.8 | 90.0 | 0.99 | 1.01 |
| " | 175 | 72.3 | 76.7 | 81.2 | 83.8 | 1.02 | 1.27 |
| " | 200 | 74.7 | 78.5 | 78.6 | 84.8 | 1.02 | 1.28 |

*Measurement repeated

In reviewing the tabularized data it will be observed that maximum brightness (90.8), was obtained at doseage rates of 100 ml per 4 pounds of dry clay. Further it will be observed, that the best results obtained with the seeding particulate were as good as those yielded by flotation, superior by 2.4 units to the results yielded by prior art magnetic separation alone, and were inferior to flotation plus magnetic separation as practiced in the prior art.

It will also be noted that an increase in $Fe_2O_3$ content begins to occur for unleached samples (and a corresponding decrease in product brightness) as the doseage rate begins to exceed about 100 ml. This is indicative of the fact that above these levels a significant amount of the seeding particulate plus the contaminants are passing uncollected through the separating apparatus. In essence there is a level of addition at which the particulates overloads capability of the separating apparatus.

EXAMPLE VIII

Samples of kaolin clay of the "Clay B" type, were subjected to substantially the same treatment conditions as have been described for the preceding Example VIII. The results yielded for this type of clay are set forth in Table VIII below:

Table VII

| Method | Aqueous Mag. Part. (ml/4# clay) | Product Brightness | Leached Brightness 4#/ton | 6#/ton | 8#/ton | $TiO_2$ % | $Fe_2O_3$ % |
|---|---|---|---|---|---|---|---|
| Float alone | — | 88.0 | 90.7 | 91.0 | 91.2 | 0.42 | 0.24 |
| Float+Magnet | — | 89.8 | 90.6 | 91.0 | 91.7 | 0.42 | 0.18 |
| Blunger alone | — | 77.9 | 84.0 | 84.1 | 84.1 | 1.63 | 0.24 |
| Magnet alone | — | 84.3 | 87.8 | 87.9 | 87.9 | 0.99 | 0.18 |
| Magnet+Magnetic Particulate | 25 | 90.1 | 91.7 | 91.9 | 92.0 | 0.99 | 0.23 |
| " | 50 | 90.5 | 92.3 | 92.3 | 92.3 | 0.31 | 0.23 |
| " | 75 | 91.1 | 92.0 | 93.0 | 93.1 | 0.09 | 0.17 |
| " | 100 | 89.0 | 92.0 | 92.6 | 92.6 | 0.05 | 0.23 |
| " | 125 | 90.0 | 92.4 | 92.7 | 92.7 | 0.09 | 0.24 |
| " | 150 | 87.4 | 92.5 | 92.7 | 92.7 | 0.16 | 0.28 |
| " | 175 | 77.5 | 90.0 | 90.5 | 90.8 | 0.45 | 0.27 |
| " | 200 | 80.1 | 91.7 | — | 91.7 | 0.61 | 0.33 |

The above tabularized data indicates that an optimum, doseage rate for the magnetic seeding particulate prepared as in Example II, is in the 75–100 ml range. Of particular significance is the fact that the best brightness obtained (93.1), is far superior to that yielded by any of the prior art techniques — including, in particular, magnetic separation alone, flotation alone, and the technique of magnetic separation plus flotation (which up until the present time has been the most advantageous method known in the prior art). It should also be noted in reviewing the tabularized data, that once again excessive doseage rates of the particulate begin to have a detrimental effect upon both $TiO_2$ and $Fe_2O_3$ content, while at the same time brightness levels decrease.

EXAMPLE IX

As has previously been indicated, preferable particulates for use with the present invention are the aqueous synthetic ferroso-ferric oxide particulates of the type prepared in Example II. In accordance with a further aspect of the present invention, however, it is found that finely ground natural magnetite, i.e. finely powdered ferroso-ferric oxide derived from ground magnetite, may be employed with the processes of the invention.

In the present Example, samples of powdered ferroso-ferric oxide were utilized, which were commercially available products of Matheson, Coleman & Bell, of Norwood, Ohio. The said material was a ground natural magnetite — i.e. not a synthetic. The particle size distribution for this product, as determined by Sedigraph analysis, indicated that 50% by weight of the particles were less than 30 micron E.S.D.

This powdered magnetite was utilized in the course of magnetically seeding kaolin clay slurries of the "Clay C" type, which were then subjected to magnetic separation, utilizing a pump setting of 10 (corresponding to 72/sec. retention time). Magnetic field intensities of 15 kilogauss were employed, and the separating apparatus was as otherwise set forth in connection with Example I herein. The matrix was again a steel wool, packed at 7.5%. The result of the foregoing operations are set forth in Table VIII below — for several levels of magnetite addition (in #/ton); for several levels (lbs/ton) of leachant addition; and also for a control test wherein non magnetite was added.

Table VIII

| Magnetite | Product | Leached Brightness | | |
|---|---|---|---|---|
| #/ton | Brightness | 4#/ton | 6#/ton | 8#/ton |
| 0 | 88.8 | 90.4 | 90.4 | 90.4 |
| 5 | 89.4 | 91.0 | 91.1 | 91.1 |
| 10 | 89.3 | 91.1 | 91.1 | 91.1 |

The tabulated data is seen to be substantially identical for both the 5 and 10 pound/ton addition levels of magnetite. It will, of course, be clear that salutary effects indeed result in consequence of the magnetite addition. The leached brightnesses resulting are superior to those obtained by use of magnetic separation, and of a flotation process, taken individually. They are, however, inferior to brightness improvements gained by use of prior art flotation coupled with magnetic separation; and they are also inferior to the brightness improvements obtained by use of magnetic separation in the presence of the synthesized activators of Example II (see Table II).

It will further be noted that the "product" brightnesses of Table IX are in fact superior to the corresponding "product" brightness obtained utilizing the aqueous particulates of Example II which include the synthesized ferroso-ferric oxide. It is hypothesized that such result obtains because the coarser magnetite of the present Example, is more efficiently extracted from the clay slurry, than is the relatively much finer synthesized precipitate discussed in the prior Examples herein. It may further be noted in the same connection, that the relatively coarse dimensions of the natural magnetite particles utilized here, caused some practical problems, i.e. it proved to be somewhat difficult maintaining the coarse magnetite in suspension, prior to passing the treated slurry through the magnetic separating apparatus.

EXAMPLE X

In the Examples thus far set forth, apparatus of the general type disclosed in Marston, U.S. Pat. No. 3,627,678 has bee utilized. In all instances of the prior Examples a field intensity of 15 kilogauss was employed, and the matrix for the said apparatus comprised a stainless steel wool which filled the canister of the apparatus at a 7.5% packing. By the latter term is meant, that although the steel wool extended to all parts of the canister, only 7.5% of the total canister volume was actually occupied by the matrix material.

While the invention is especially well suited for use with prior art collection matrices such as those formed of steel wool, other matrices as are known in the art may be employed, including those formed of wire, steel balls, steel rods, tacks, porous ferromagnetic foams or so forth. Similarly the invention may be practiced with numerous other prior art separator apparatus including e.g. the spaced plate type of separators shown, e.g. in numerous of the patents to G. H. Jones, such as U.S. Pat. No. 2,834,470.

In the present Example, the invention was practiced with a Marston-type of separator — but utilizing other types of matrices. In addition, the magnetic separator was in a number of instances operated with a magnetic field intensity of 5 kilogauss.

Specifically, matrices of the following types were utilized: (a) no matrix; (b) 7.5% packed steel wool, extended throughout the entire canister; (c) steel wool, positioned only at the outflow portions of the generally cylindrical canister; (d) 1 inch carpet tacks packed throughout the canister; and (e) steel balls having an average diameter of about 0.17 inch, packed throughout the canister.

In the instance of procedure (c), the overall axial length of the separator canister was 22inches, and its diameter approximately 1½. The said steel wool was positioned at the last 6 inches axial length thereof. The objective of such procedure was to encourage a degree of magnetic flocculation to occur, i.e. in consequence of the magnetic field, well prior to the seeded slurry impinging at the matrix.

Utilizing the varying configurations above mentioned, a series of kaolin clay samples of the "Clay D" type were seeded with 100 ml per 4# clay, utilizing the magnetic particulate of Example II. One group of the seeded samples were subjected to magnetic separation using a 5 kilogauss field; and a second group of seeded samples were subjected to separation by a 15 kilogauss field. The ensuing results are set forth in Table IX hereinbelow:

Table IX

| Matrix | Magnetic Field = 5 KG | | | | Magnetic Field = 15 KG | | | |
|---|---|---|---|---|---|---|---|---|
| | Brightness | | TiO$_2$ | Fe$_2$O$_3$ | Brightness | | TiO$_2$ | Fe$_2$O$_3$ |
| | Product | Leached(8#/ton) | (%) | (%) | Product | Leached(8#/ton) | (%) | (%) |
| None | 70.0 | 83.2 | 1.48 | 1.11 | 73.7 | 86.7 | 1.48 | 1.20 |
| Steel Wool | 88.2 | 91.7 | 0.19 | 1.01 | 90.0 | 92.2 | 0.19 | 0.95 |
| 6"Steel Wool | 82.8 | 89.9 | 0.73 | 1.09 | 83.2 | 90.6 | 0.51 | 0.98 |
| Tacks | 79.7 | 88.7 | 1.15 | 1.21 | 83.0 | 89.5 | 1.05 | 1.21 |
| Steel Balls | 85.7 | 89.5 | 0.70 | 1.09 | 85.9 | 89.8 | 0.66 | 0.17 |

In a second series of tests kaolin clay samples of the "Clay B" type were seeded with 75 ml per 4# dry clay with the same simple magnetic seeding particulate of Example II. Similar set of tests were run, as has been described in connection with Table XI, with the resultant data being tabulated in Table X below:

Table X

| Matrix | Magnetic Field = 5 KG | | | | Magnetic Field = 15 KG | | | |
|---|---|---|---|---|---|---|---|---|
| | Brightness | | TiO$_2$ | Fe$_2$O$_3$ | Brightness | | TiO$_2$ | Fe$_2$O$_3$ |
| | Product | Leached(8#/ton) | (%) | (%) | Product | Leached(8#/ton) | (%) | (%) |
| None | 71.0 | 82.0 | 1.56 | 0.27 | 72.9 | 84.9 | 1.56 | 0.18 |
| Steel Wool | 87.4 | 92.3 | 0.22 | 0.18 | 87.4 | 92.3 | 0.16 | 0.20 |
| 6"Steel Wool | 87.9 | 92.1 | 0.32 | 0.21 | 88.2 | 92.3 | 0.19 | 0.20 |
| Tacks | 82.7 | 89.4 | 0.58 | 0.27 | 84.2 | 90.4 | 0.48 | 0.24 |
| Steel Balls | 87.9 | 88.5 | 0.3 | 0.24 | 88.0 | 89.0 | 0.26 | 0.24 |
| Steel Balls* | 84.0 | 86.0 | 1.56 | 0.24 | 84.3 | 86.6 | 1.44 | 0.24 |

*no particulate (control)

In all instances for the tabulated data of Tables IX and X, cross-reference may be had to Table I herein — setting forth control data. First, it will be evident that the matrices in order of efficiency are as follows: Steel wool; 6 inch steel wool; steel balls; carpet tacks; no matrix.

Of particular significance is the fact that with steel wool matrices and in the presence of the magnetic particulates of the invention, brightness improvements are obtained at 5 kilogauss field intensity, which are superior to the results yielded for prior art magnetic separation at 15 kilogauss. Indeed for the "Clay B" samples of Table X the brightness improvements that are yielded with steel wool matrices in the presence of the magnetic particulates, are superior at 5 kilogauss field intensity to the improvements in brightness yielded by flotation plus magnetic separation at 15 kilogauss without the said particulates.

Of further significance, it will be observed that both the carpet tacks and steel ball matrices in the presence of the low 5 kilogauss field, yielded brightness improvements for the "Clay B" sample, which are superior to the brightness improvements gained by using steel wool matrices without the particulates of the invention at 15 kilogauss.

It will further be noted that at 15 kilogauss field intensity, the effect of the particulate additions is to yield brightness improvements which are superior to those provided by prior art flotation plus magnetic separation — for both of the clay types which are exemplified in Tables IX and X.

It should, of course, be appreciated in connection with the foregoing, that employment of a magnetic field of relatively reduced intensity (i.e. as compared to the high intensity treatments propounded in the prior art) has enormous consequence for the present art. Among these are a vast reduction in the capital outlays which have in the past been required for apparatus capable of producing high intensity field. Thus, e.g. the relatively enormous cost of high current capacity coils may be obviated where field intensities are utilized. Similarly, operating costs are greatly reduced — a factor which is of ever-increasing significance in view of precipitously escalating costs of electrical power. In the foregoing connection it should especially be borne in mind that if field intensity is increased for a given magnet configuration, the power requirement increases as the square of the field multiplier — i.e. to increase H by a factor of 2, the power requirement must be increased by a factor of 4. In a similar vein it will be evident that maintenance costs for apparatus designed to operate at relatively low field intensities, are much reduced in comparison to the maintenance cost associated with high intensity separators.

EXAMPLE XII

In this Example four different methods were utilized in synthesizing ferroso-ferric oxide particulates for use in the invention: (a) The procedure set forth in Example II was utilized; (b) The procedure of Example II was followed, except that the solution of iron salts was heated and placed in a Waring blender. The ammonium hydroxide solution was then added instantaneously, yielding a viscous black liquid which did not separate as readily as that prepared by method (a); (c) the composition obtained by method (b) was filtered, and then washed with copious quantities of deionized water. Finally it was washed with 0.01 normal HCl. The dry sediment was dispersed in boiling water; (d) The sediment of ferroso-ferric oxide obtained by using method (c) was dispersed in a boiling solution of 0.5% soap.

The objective of using varying techniques for synthesizing the particulates was principally one of introducing additional conditions favoring the production of a large number of nuclei, in that large numbers of nuclei are (in general) advantageous for use in the invention. Method (a), to some extent, favors the production of high number of nuclei — by use of high concentration of reagents, and by vigorous agitation. On the other hand, additional factors favoring production of large number of nuclei are not present in method (a), including the use of high temperatures and of rapid addition of one reagent to the other.

The magnetic seeding materials prepared by methods (a), (b), (c) and (d) were thereupon utilized in the course of treating kaolin clay samples. In each instance the doseage rate was equalized, so that each 4# clay sample contained 3.72g of ferroso-ferric oxide, i.e. the equivalent of 75 ml of the aqueous compositions of Example II. As a control experiment, the clay samples were also dosed with a similar quantity of powdered magnetite of the type set forth in Example IX. The separating apparatus was of the same type utilized in previous Examples, with a field of 15 kilogauss being employed; a matrix of 7.5% steel wool, and a pump setting of 10. The resultant data is set forth in Table XII for two different sets of clay samples, i.e. "Clay B" and "Clay D".

Table XI

| Clay | Preparation Method | Product Brightness | Leached Brightness 4#/ton | 6#/ton | 8#/ton | TiO$_2$ (%) | Fe$_2$O$_3$ (%) |
|---|---|---|---|---|---|---|---|
| Clay B | (a) | 91.1 | 92.0 | 93.1 | 93.1 | 0.09 | 0.17 |
|  | (b) | 84.0 | 90.1 | 90.2 | 90.2 | 0.43 | 0.26 |
|  | (c) | 88.2 | 90.0 | 90.0 | 90.0 | 0.88 | 0.13 |
|  | (d) | 88.2 | 89.5 | 89.5 | 89.5 | 0.87 | 0.13 |
|  | Magnetite | 88.1 | 90.2 | 90.2 | 90.2 | 0.92 | 0.23 |
| Clay D | (a) | 87.5 | 89.9 | 90.0 | 90.0 | 0.81 | 0.89 |
|  | (b) | 87.5 | 91.2 | 91.2 | 91.2 | 0.87 | 1.03 |
|  | (c) | 89.5 | 91.0 | 91.0 | 91.0 | 0.87 | 0.84 |
|  | (d) | 89.6 | 90.7 | 90.7 | 90.7 | 0.94 | 0.78 |
|  | Magnetite | 89.4 | 91.1 | 91.1 | 91.1 | 0.90 | 0.83 |

Consideration of Table XI indicates that, in general, each of the methods (a) through (d) yield effective results with the invention. In the case of the "Clay B" samples, the most effective results were yielded by method (a). In the instance of the "Clay D" samples, methods (b), (c), and (d), and even seeding with magnetite, yield results markedly superior to those obtained even by use of prior art flotation plus by magnetic separation.

Particle size has a critical effect on the particle density per unit volume of the seeded slurry, in that particle density is a cubic function of particle sizes. If the particle size is indeed finer when prepared by method (b) than when prepared by method (a), two countervailing factors are at work. In particular the smaller particles are not captured as readily by the separator matrix; conversely there are many more particles present to seed the clay slurry, and thus improve extraction. The differential between leached and product brightness in methods (b), (c) and (d) suggest that an excess of iron passes through the magnetic separator, indicating that lowered doseage rates of the finer precipitates would be advantageous. This will become further evident in connection with Example XIII.

EXAMPLE XIII

In this Example the magnetic seeding particulate was prepared as in Example II, with the important exception that the ammonium hydroxide was added rapidly to the heated iron salt solution, thereby encouraging (as previously mentioned) the production of large numbers of small nuclei. Samples of "Clay D" and of "Clay B" kaolins were seeded with the resultant particulate and were subjected to magnetic separation in apparatus and under conditions as previously set forth. The field intensity in all instances was 15 kilogauss, and a pump setting of 10 (72 sec. retention time) was utilized. Doseage rate was varied and the steel wool matrix was 7.5% packed. The brightness data obtained in consequence, is set forth in Table XII for the "Clay D" samples, and in Table XIII for the "Clay B" samples.

Table XII

| Dose Rate ml./4 lb. | Product Brightness | Leached Brightness 4#/ton | 6#/ton | 8#/ton | TiO$_2$ (%) | Fe$_2$O$_3$ (%) |
|---|---|---|---|---|---|---|
| 15 | 89.8 | 91.0 | 91.2 | 91.2 | 0.32 | 1.03 |
| 25 | 91.1 | — | — | 92.2 | 0.19 | 0.88 |
| 50 | 87.7 | — | — | 90.9 | 0.19 | 0.97 |
| 75 | 87.5 | 91.2 | 91.2 | 91.2 | 0.87 | 1.03 |

Table XIII

| Dose Rate ml./4 lb. | Product Brightness | Leached Brightness 9#/ton | 6#/ton | 8#/ton | TiO$_2$ (%) | Fe$_2$O$_3$ (%) |
|---|---|---|---|---|---|---|
| 15 | 88.9 | 90.4 | 90.6 | 90.6 | 0.87 | 0.27 |
| 25 | 90.9 | 92.0 | 92.0 | 92.7 | 0.05 | 0.21 |
| 50 | 90.8 | 90.8 | 91.9 | 92.3 | 0.26 | 0.20 |
| 75 | 84.0 | 90.1 | 90.2 | 90.2 | 0.43 | 0.26 |

At doseage rate levels of 25 ml per 4# dry clay, the results achieved with the seeding particulate used in this Example are markedly superior to results yielded by flotation plus conventional magnetic separation. It will further be noted that the results for "Clay B" samples (best brightness 92.2) are better than where the synthesized particulates are prepared via slow addition of ammonium hydroxide. Of additional significance, however, is the fact that the optimum doseage rate with the seeding materials prepared in accordance with the procedure of the present Example is only one-third of the optimum doseage rates indicated where the particulates are prepared by the methods of Example II. The explanation is believed to be that the much larger number of nuclei produced by the method of this Example, enables (or "requires") use of much lower doseage levels in order to achieve optimal results. Where the doseage levels of the present type of particulates are raised too high, overloading of the separating apparatus will occur. It will, of course, be evident that a particular advantage of using the much smaller doseage levels is a comparatively great saving in the cost of materials.

EXAMPLE XIV

The present Example illustrates further, the manner in which practice of the present invention enables use of vastly reduced field intensities in the course of brightening mineral slurries. In particular, a magnetic seeding particulate prepared as in Example XIV, was utilized herein for seeding kaolin clay slurry samples of the "Clay D" and of the "Clay B" types. The seeded slurries were thereupon passed through magnetic separating apparatus of the type discussed in connection with Example II. A matrix of 7.5% packed steel wool was employed. The pump setting was 10 (corresponding to 72 sec. retention time); and a field intensity of only 7 kilogauss was utilized. The doseage rate of the seeding particulate was varied. Brightness data obtained in consequence, is set forth in Table XIV below:

Table XIV

| Clay | Dose Rate ml./4 lb. | Brightness Product | Brightness Leached (8#/ton) | TiO$_2$ (%) | Fe$_2$O$_3$ (%) |
|---|---|---|---|---|---|
| | 20 | 89.8 | 91.8 | 0.48 | 1.02 |
| Clay D | 30 | 89.8 | 92.2 | 0.22 | 0.97 |
| | 40 | 89.7 | 92.3 | 0.22 | 0.97 |
| | 20 | 88.8 | 90.5 | 0.70 | 0.21 |
| Clay B | 30 | 88.9 | 91.5 | 0.51 | 0.20 |
| | 40 | 88.4 | 92.5 | 0.31 | 0.20 |

The extremely unexpected results set forth in the Table, indicate brightness gains with a field strength of but 7 kilogauss and doseage rates of between 20 and 40 ml per 4# dry clay, which are markedly superior to the results obtained using prior art flotation plus magnetic separation at high field strengths, i.e. at 15 kilogauss. See in this connection the corresponding control data of Table I herein. Similarly the reduction in TiO$_2$ and Fe$_2$O$_3$ content, is comparable to the results achieved by the cited prior art combined technique.

EXAMPLE XV

In the present Example, the powdered natural magnetite described in Example IX was utilized for seeding kaolin clay slurries of the type used in Example XIII. The seeded slurries were then subjected to low intensity magnetic separation, again as in Example XIV. The results of these operations are set forth in Table XV hereinbelow:

Table XV

| Clay | Dose Rate lb/ton | Brightness Product | Brightness Leached (8#/ton) | TiO$_2$ (%) | Fe$_2$O$_3$ (%) |
|---|---|---|---|---|---|
| | 2 | 88.6 | 90.4 | 0.87 | 0.97 |
| Clay D | 4 | 88.8 | 90.7 | 0.87 | 1.02 |
| | 6 | 88.7 | 90.4 | 0.93 | 0.99 |
| | 2 | 87.5 | 89.8 | 1.02 | 0.24 |
| Clay B | 4 | 86.9 | 89.5 | 1.02 | 0.26 |
| | 6 | 87.0 | 89.5 | 0.99 | 0.20 |

Consideration of the above tabularized data, will establish that the brightening improvements achieved, are generally inferior to those obtained by use of the preferred, synthetized ferroso-ferric oxide particulates, e.g. as in Example XIV. However, the results achieved, for example with the "Clay B" samples, while inferior to those enabled by conventional flotation, are superior to brightening effected by conventional magnetic separation at 15 kilogauss. Further, in the instance of the "Clay D" samples, the brightening results achieved are superior to those effected through use of conventional magnetic separation at 15 kilogauss, or of conventional flotation, or via conventional flotation plus magnetic separation at 15 kilogauss.

It will be evident, particularly from consideration of Examples XIII and XIV, and by comparison of the data tabulated in these Examples with the data of Table II herein (Example III), that the concentration of synthesized ferroso-ferric oxide particulate yielding maximum efficacy in a given separation, is in part a function of the mode of synthesis of the particulate. In general, however, a useful concentration range for the synthesized aqueous ferroso-ferric oxide particulate, is from approximately 10 to 150 ml/4 lb. of dry clay, where each said mililiter includes about 0.05g equivalent of Fe$_3$O$_4$. This, it may be noted, corresponds to a range of approximately ½ to 7 lbs. per ton dry clay of Fe$_3$O$_4$, in that, as previously mentioned, each 100 ml of the aforementioned aqueous particulate contains approximately 5 grams equivalent of Fe$_3$O$_4$.

EXAMPLE XVI

In this Example aqueous particulates of additional ferrimagnetic materials were utilized as seeding particulates in the present invention. In particular Nickel and Cobalt Ferrites were prepared using the procedure described in "Preparation, Growth, & Study of Ultrafine Ferrite Particles" (Schuelle, W. J. and Deetscreek, V. D., J. Appl. Phys. 32 Suppl, No. 3, 235S, [1961]). This is similar to the Elmore method previously referenced, for producing ferroso-ferric oxide. Nickel (or Cobalt) Chloride was thus mixed with the ferric chloride in the molar ratio of 1:1.8 (as for ferroso-ferric oxide) and NH$_4$OH added to the mixture rapidly.

The magnetic seeding particulates thus prepared were then utilized for seeding kaolin clay slurry samples of the Clay B type. The seeded slurries were thereupon passed through magnetic separating apparatus of the type discussed in connection with Example II. A matrix of 7.5% packed steel wool was employed. The pump setting was 10 (corresponding to 72 sec. retention time); and a field density of 15 kilogauss was utilized. The doseage rate of the seeding particulate was varied. Brightness data obtained in consequence is set forth in Table XVI below:

Table XVI

| Magnetic Seeding Particulate | Concentration (ml/4 lb. clay) | Brightness Product | Brightness Leached (8#/ton) | TiO$_2$ (%) | Fe$_2$O$_3$ (%) |
|---|---|---|---|---|---|
| NiFe$_2$O$_4$ | 25 | 86.8 | 89.6 | 0.93 | 0.13 |
| NiFe$_2$O$_4$ | 40 | 88.4 | 90.7 | 0.81 | 0.11 |
| CoFe$_2$O$_4$ | 25 | 87.5 | 90.0 | 0.78 | 0.16 |
| CoFe$_2$O$_4$ | 40 | 88.2 | 90.6 | 0.81 | 0.16 |

As may be ascertained from the control data of Table I, these results are inferior to those yielded by prior art flotation coupled with magnetic separation. They are, however, in all instances, superior to prior art magnetic separation, conducted under similar conditions — but without use of the seeding methods of the present invention.

EXAMPLES XVII THROUGH XXI

In the series of Examples hereinbelow set forth, the methodology of the present invention was practiced upon a series of kaolin clay samples, with resultant highly effective brightening being obtained by use of imposed magnetic fields as low as 0.5 kg.

In all of these Examples, the magnetic seeding particulate utilized was prepared as described in Example XII(b), and was thus an aqueous, unpeptized dispersion which could be regarded as physically "unstable" in the sense that the particulate would tend to settle out from the aqueous carrier and/or change size characteristics over an extended period.

Three different types of kaolin clay samples were used in these Examples, hereinafter identified as clays "E", "F" and "G". Clay "F" was a relatively coarse, soft cream Georgia kaolin similar to clays A and B of prior Examples; clay "G" was a relatively fine, soft, cream Georgia kaolin, similar to clays C and D as previously discussed in earlier Examples; clay E was a blend of coarse and fine, soft, cream Georgia kaolins. Characteristics of the three aforementioned clays (as crudes) are given in the following Table:

Table XVII

|  | Clay E | Clay F | Clay G |
|---|---|---|---|
| Crude Brightness | 81.7 | 83.4 | 81.0 |
| TiO$_2$ content (%) | 1.66 | 1.68 | 1.33 |
| Fe$_2$O$_3$ content (%) | 0.66 | — | — |
| % < 2μ e.s.d. | 68.5 | 45.5 | 68.5 |

In all instances in these Examples, approximately 5 lbs. of the crude clay (4 lbs. dry weight), was initially blunged at 60% solids with the required amount of dispersant. The concentration and nature of dispersant will be seen hereinbelow to vary from Example to Example, and it may be noted in that connection that optimization of the present process when used with given clays, has been found to be partially a function of the dispersant and its concentration.

The clay samples following blunging were conditioned for 15 minutes using high speed mixing. The approximate work input during this step was about 50 hp-hr/ton of dry clay — with 30 to 60 hp-hr/ton being a preferred range of operation. At this point the seeding particulate was added to the samples at the specific concentration levels found to be relatively optimum, and mixing was then continued for approximately 1 minute. It may be noted in this connection that it has been found that the seeding particulate is indeed preferably added subsequent to most of the conditioning work, i.e. subsequent to the dissipation of approximately 30 to 60 hp-hrs/ton solids of work. The further conditioning in the presence of the seeding particulate, preferably is conducted for approximately 30 to 90 seconds.

Following dispersion of the seeding particulate, the seeded slurry samples are diluted to a level of 20 to 30% solids, and this slurry is passed through magnetic separating apparatus of the Marston or similar type — i.e. preferably through a porous ferromagnetic matrix maintained in an applied magnetic field. A given volume of the "magnetted" slurry was in all instances caught for further analysis. This was flocced with H$_2$SO$_4$, filtered and dried. Product brightness, TiO$_2$ and Fe$_2$O$_3$ content were measured. A sample of the slurry was also cut using a centrifuge, to provide a 90% less than 2 micron E.S.D. fraction. This fraction was flocculated with H$_2$SO$_4$ to a pH of 3.5, and leached with sodium hydrosulfite at a level of 8 lbs/ton. The sample was dried and leached brightness measured.

The major variables in the Examples hereinbelow were variation in the intensity of the applied magnetic field — typical variations ran from 0.64 kG to 18.2kG; variation in retention time in the field; and variation in slurry solids, usually running from 20 to 30% solids.

Dispersant and magnetic particulate concentration data for the three clay types "E", "F" and "G" processed in these Examples, are set forth in Table XVIII below, where all data is referenced to additional levels per 4 lbs. of dry clay. The concentration levels (or "dose rates") for the magnetic particulates may be converted to kG of Fe$_3$O$_4$ per ton of clay, as in Example II. The pH of the slurries prior to treatment in the magnetic separator was in the range of 9.0 to 9.2

Table XVIII

|  | Dispersant | Particulate Concentration |
|---|---|---|
| Clay E | 100 ml sodium silicate solution (4% w/w) 10 ml NH$_4$OH (26° Baume) | 40 ml/4# dry clay |
| Clay F | 0.5g sodium hexametaphosphate (dry) 0.5g Nalco 5WM410 (as | 50 ml/4# dry clay |

Table XVIII-continued

|  | Dispersant | Particulate Concentration |
|---|---|---|
|  | received) 15 ml NH$_4$OH (26° Baume) |  |
| Clay G | 0.6g sodium hexametaphosphate (dry) 0.6 Nalco 5WM410 (a sodium polyacrylate, used as received) 15 ml NH$_4$OH (26° Baume) | 40 ml/4# dry clay |

EXAMPLE XVII

In Table XIX hereinbelow, data is set forth with respect to the aforementioned Clay E samples which have been processed in accordance with the procedure just described. More specifically clay E feed mix samples, both with and without use of the seeding particulate of the invention, are seen to be subjected to magnetic separation under various magnetic field intensity conditions, and for two differing volumes of slurry collection — i.e. for 800 ml of collection, and for 3200 ml of collection. The canister utilized in obtaining the data in Table XIX had an effective volume of 725 cm$^3$, whereby the 3200 ml volume corresponded to a collection of approximately 4.4 canister volumes, whereas the 800 ml corresponded to approximately 1.1 canister volumes collected. Since a degree of contamination of the collection matrix will ensue during magnetic separation processing, it is to be expected — as is borne out by examination of the tabularized data — that where the volume of slurry collected is less, i.e. for the 800 ml case, that the corresponding brightnesses will be superior, and the titania or so forth will be more effectively removed. In all instances the data in this Example reflects a retention time in the field of 43 seconds.

Table XIX

| Volume Collected | Field (KG) | With Seeding Particulate Brightness | | TiO$_2$ % | Fe$_2$O$_3$ % | Without Seeding Particulate Brightness | |
|---|---|---|---|---|---|---|---|
|  |  | Product | Leached |  |  | Product | Leached |
| 800 ml | 0.64 | 84.9 | 89.5 | 0.78 | 0.64 |  |  |
|  | 1.6 | 87.4 | 90.4 | 0.56 | 0.63 |  |  |
|  | 2.3 | 88.7 | 91.4 | 0.45 | 0.62 |  |  |
|  | 3.9 | 89.3 | 91.6 | 0.42 | 0.62 |  |  |
|  | 6.1 | 90.0 | 91.7 | 0.35 | 0.61 |  |  |
|  | 8.3 | 90.3 | 92.0 | 0.29 | 0.63 |  |  |
|  | 12.2 | 90.4 | 92.3 | 0.31 | 0.62 |  |  |
|  | 18.1 | 90.7 | 92.6 | 0.20 | 0.61 |  |  |
| 3200 ml | 0.64 | 83.7 | 88.9 | 0.94 | 0.63 | 84.2 | 88.3 |
|  | 1.6 | 86.3 | 90.0 | 0.60 | 0.63 | 85.6 | 89.2 |
|  | 2.3 | 87.9 | 91.0 | 0.50 | 0.61 | 86.0 | 89.6 |
|  | 3.9 | 88.5 | 91.3 | 0.48 | 0.64 | 87.0 | 89.8 |
|  | 6.1 | 89.4 | 91.5 | 0.40 | 0.64 | 87.5 | 90.1 |
|  | 8.3 | 89.5 | 91.8 | 0.30 | 0.63 | 87.9 | 90.2 |
|  | 12.2 | 89.6 | 91.9 | 0.31 | 0.61 | 88.5 | 90.4 |
|  | 18.1 | 89.8 | 92.0 | 0.28 | 0.61 | 89.0 | 90.6 |

The data set forth in Table XX with respect to leached brightnesses is displayed in graphic form in FIG. 1 herein, which thus plots clay brightnesses as a function of applied magnetic field for 5 different sets of processing conditions for the clay E. The curve E-1 represents brightnesses obtained where clay E is unseeded, but subjected to leaching. This curve substantially therefore, represents prior art processing conditions.

The curves E-2 and E-3, both represent brightnesses yielded where clay E is seeded prior to the magnetic separation, as previously discussed, but the samples are not leached. As indicated in FIG. 1 curve E-2 corresponds to the 3200 ml collection volume, whereas curve E-3 corresponds to the 800 ml collection volume. It is significant to observe that the curve E-3 actually crosses over curve E-1 at approximately 5.5 kG, indicating that in the presence of seeding in accordance with the method of the invention, brightness of samples — even in the absence of leaching — begin to exceed prior art brightnesses, even with a field as low as 5.5 kG.

The curves E-4 and E-5 illustrate the truly remarkable results obtained by means of the present invention. In these instances seeding and leaching are both utilized, the lower curve E-4 representing the results where 3200 ml are processed, and the upper curve E-5 representing the brightness results where a lesser volume, i.e. 800 ml, is processed.

It will be seen that the brightness values illustrated by the curves E-4 and E-5 exceed those yielded by the conventional methodology plotted in curve E-1 for all values of applied field. Most amazing, however, is the fact that these curves clearly illustrate that brightness improvements are yielded by the present invention at exceedingly low fields, which by means of prior art techniques can only be reached by very intense fields. For example, the remarkable fact may be noted that at only 2.3 kG applied field, brightness improvements are obtained with seeding and leaching which are superior to those obtained without seeding (but with leaching) in fields of 18 kG — the latter being a very high field intensity indeed. Similarly it will be noted from both Table XX and the graphs of FIG. 1, that brightnesses of the order of 89 to 89.5 are obtainable by the use of the present invention at a field of 1 kG; and similarly that the brightnesses equal or exceed 90 beginning at fields as low as 2 kG.

EXAMPLE XVIII

In Table XX hereinbelow, data is set forth with respect to the aforementioned clay F samples, which have been processed in accordance with the procedures just described. More specifically, results are tabularized for such samples which are processed in the magnetic separator at 20% w/w solids, and for three different retention times. The samples are further processed both with and without use of the magnetic seeding particulate of the invention, and under various magnetic field intensity conditions. In all instances the results refer to processing of 3200 ml quantities of slurry — corresponding to approximately 4.4 canister volumes.

Table XX

| Retention Time | Field (KG) | With Magnetic Seeding Particulate | | $TiO_2$ % | $Fe_2O_3$ % | Without Magnetic Seeding Particulate | | $TiO_2$ % | $Fe_2O_3$ % |
|---|---|---|---|---|---|---|---|---|---|
| | | Brightness Product | Leached | | | Brightness Product | Leached | | |
| 127 sec. | 0.64 | 87.2 | 90.8 | 0.29 | 0.16 | — | — | — | — |
| | 1.6 | 89.0 | 91.5 | 0.27 | 0.16 | 84.5 | 88.0 | 1.20 | 0.16 |
| | 2.3 | 89.3 | 92.3 | 0.09 | 0.16 | — | — | — | — |
| | 3.9 | 89.6 | 92.4 | 0.07 | 0.16 | 85.7 | 88.5 | 1.12 | 0.17 |
| | 6.1 | 90.0 | 92.4 | 0.06 | 0.16 | — | — | — | — |
| | 8.3 | 90.0 | 92.4 | 0.06 | 0.16 | 86.5 | 89.3 | 1.06 | 0.18 |
| | 12.2 | 90.0 | 92.5 | 0.05 | 0.16 | — | — | — | — |
| | 18.1 | 90.0 | 92.5 | 0.05 | 0.16 | 87.2 | 89.8 | 0.98 | 0.18 |
| 62 sec. | 0.64 | 86.8 | 91.0 | 0.30 | 0.14 | — | — | 0.98 | 0.18 |
| | 1.6 | 88.7 | 91.9 | 0.20 | 0.18 | 85.0 | 88.5 | 1.29 | 0.18 |
| | 2.3 | 89.4 | 92.0 | 0.13 | 0.14 | — | — | — | — |
| | 3.9 | 89.6 | 92.0 | 0.09 | 0.14 | 85.7 | 88.8 | 1.15 | 0.19 |
| | 6.1 | 89.8 | 92.0 | 0.08 | 0.18 | — | — | — | — |
| | 8.3 | 89.8 | 92.2 | 0.07 | 0.17 | 86.5 | 89.0 | 1.10 | 0.17 |
| | 12.2 | 89.8 | 92.2 | 0.06 | 0.19 | — | — | — | — |
| | 18.1 | 89.8 | 92.2 | 0.06 | 0.14 | 87.0 | 89.5 | 1.02 | 0.17 |
| 43 sec. | 0.64 | 86.9 | 91.0 | 0.40 | 0.16 | — | — | — | — |
| | 1.6 | 88.3 | 91.8 | 0.35 | 0.17 | 84.3 | 88.0 | 1.38 | 0.18 |
| | 2.3 | 88.3 | 92.1 | 0.28 | 0.18 | — | — | — | — |
| | 3.9 | 88.5 | 92.2 | 0.24 | 0.16 | 85.0 | 88.3 | 1.29 | 0.18 |
| | 6.1 | 89.3 | 92.5 | 0.14 | 0.16 | — | — | — | — |
| | 8.3 | 89.1 | 92.5 | 0.14 | 0.16 | 85.8 | 88.6 | 1.15 | 0.18 |
| | 12.2 | 89.2 | 92.5 | 0.14 | 0.16 | — | — | — | — |
| | 18.1 | 89.3 | 92.5 | 0.14 | 0.16 | 86.5 | 89.0 | 1.10 | 0.18 |

Figure 2:
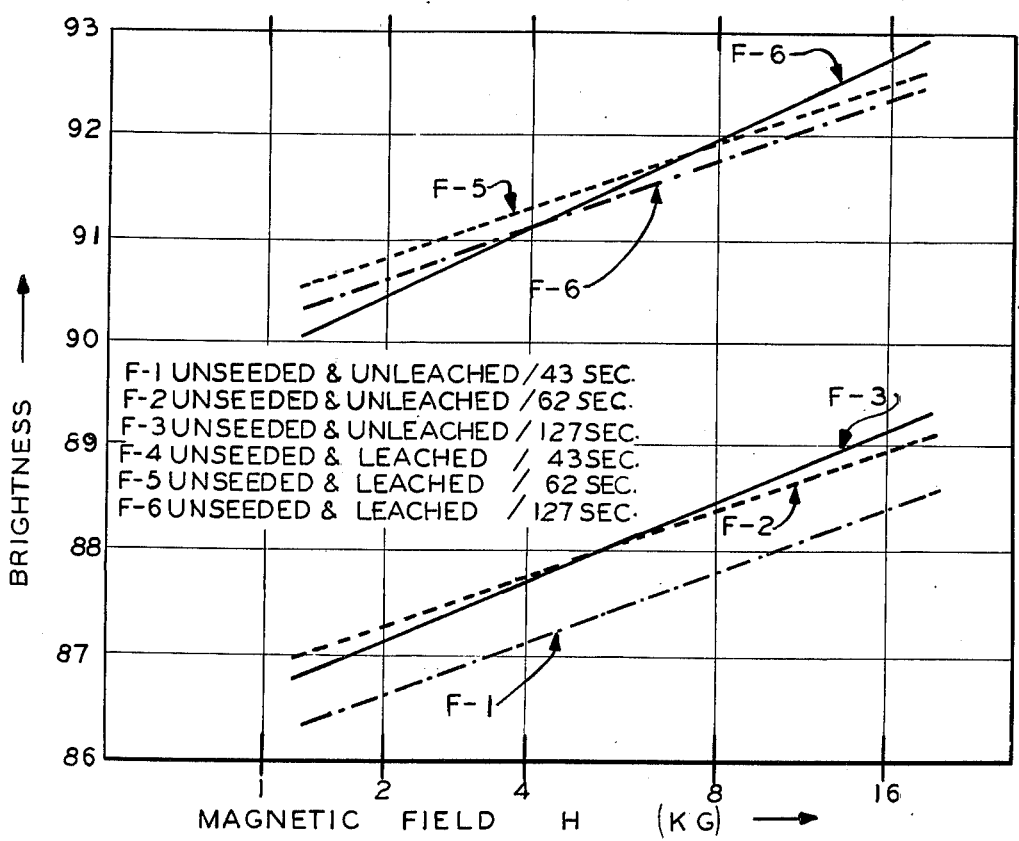
FIG. 2 is a graph depicting brightness improvements as a function of applied magnetic field for a further clay, which has been subjected to a magnetic separation by processes based on the invention.

In FIG. 2 the tabularized data is plotted for the clay F samples which were processed without use of the magnetic seeding particulate of the invention. The conditions represented by the six curves set forth are indicated in the legends on the Figure. Specifically curves F-1, F-2 and F-3 illustrate brightnesses obtained in the absence of leaching for three different retention times; and the curves F-4, F-5 and F-6 illustrate brightness results obtained with leaching, for the same three different retention times.

Figure 3:
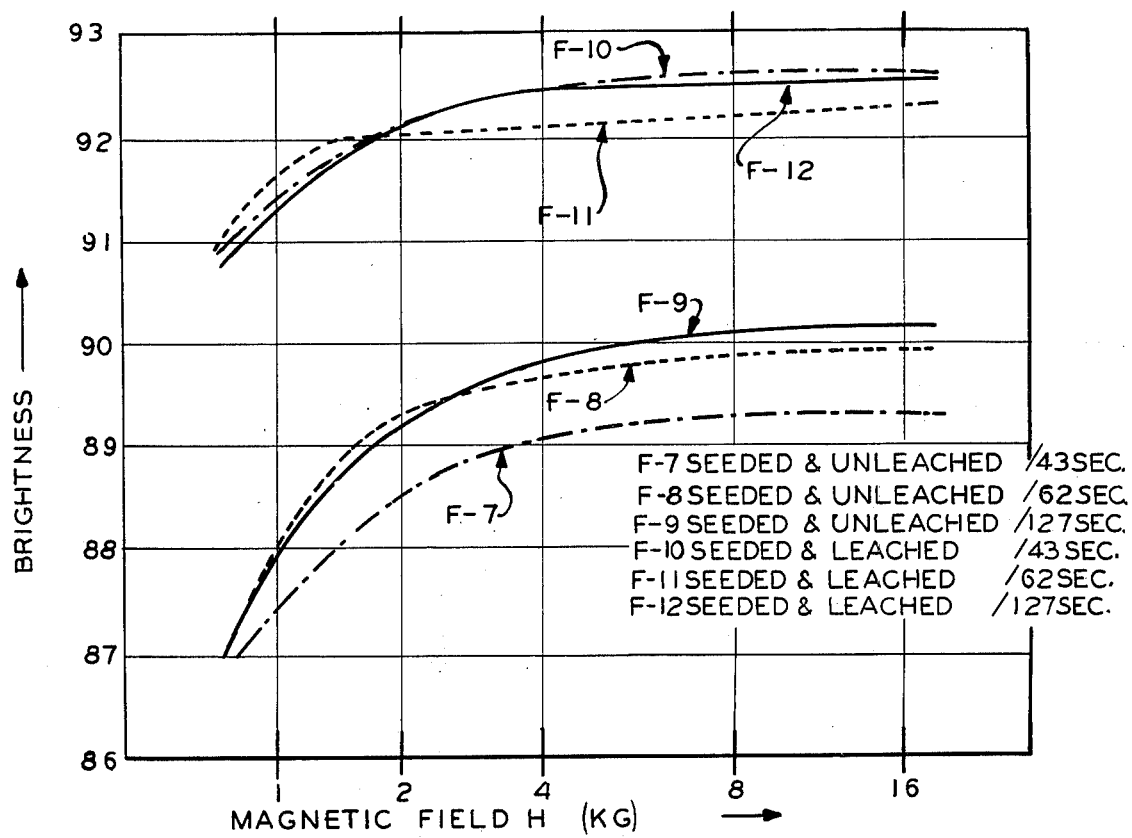
FIG. 3 is a graph setting forth comparison data for clays as in FIG. 2, which have, however, been subjected to magnetic separation without use of the present invention.

In FIG. 3, a series of six further curves are plotted, in all instances representing the tabularized data of Table XX, for the cases where samples of clay F have been processed with use of the magnetic seeding particulates of the invention. In general, it will be noted in comparing FIGS. 2 and 3, that in the absence of seeding the best brightness achieved was approximately 89.8 under conditions of applied field of 18.1 kG, and retention time of 127 seconds. The brightness results obtained with seeding, as illustrated in FIG. 3, are clearly vastly superior. For example, it will be evident that a 91 brightness is yielded at fields as low as 0.6 kG. Similarly, it will be clear that 92 brightnesses were obtainable at applied fields of less than 2.5 kG with retention times as low as 62 seconds.

EXAMPLE XIX

For purposes of comparison, several samples of clay F were processed at a higher solids level — in this case 30% w/w. The experimental conditions were otherwise as described in connection with the preceding Example XIX, with retention times of 62 and 127 seconds being utilized, and with total collection of 3200 ml of magnetted slurry being effected. The results of such operations are set forth in Table XXI hereinbelow.

Table XXI

| Field KG | Retention Time 127 sec. Brightness | | Retention Time 62 sec. Brightness | |
|---|---|---|---|---|
| | Product | Leached | Product | Leached |
| 1.6 | 88.0 | 91.0 | — | — |
| 3.9 | 88.8 | 92.0 | — | — |
| 8.3 | 90.6 | 92.3 | — | — |
| 18.1 | 90.5 | 92.3 | 89.5 | 92.3 |

EXAMPLE XXI

In Table XXII hereinbelow data is set forth with respect to the aforementioned clay G samples, which have been processed in accordance with the previously described procedures. As was the case in Example XIX, results are now tabularized for clay G samples which are processed in the magnetic separator at 20% w/w solids, and for three different retention times; i.e. at 43, 62 and 127 seconds. The samples are further, processed both with and without use of the magnetic seeding particulate of the invention, and under various magnetic field intensity conditions. In all instances the results refer to processing of 3200 ml quantities of slurry, which corresponds to approximately 4.4 canister volumes.

TABLE XXII

| Retention Time | Field (KG) | With Magnetic Seeding Particulate | | | | Without Magnetic Seeding Particulate | | | |
|---|---|---|---|---|---|---|---|---|---|
| | | Brightness | | $TiO_2$ % | $Fe_2O_3$ % | Brightness | | $TiO_2$ % | $Fe_2O_3$ % |
| | | Product | Leaching | | | Product | Leaching | | |
| 127 sec. | 0.64 | 84.5 | 89.2 | 0.66 | 0.78 | — | — | — | — |
| | 1.6 | 86.8 | 91.2 | 0.44 | 0.78 | 84.6 | 89.5 | 1.06 | 0.82 |
| | 2.3 | 87.8 | 91.4 | 0.34 | 0.78 | — | — | — | — |
| | 3.9 | 88.6 | 91.5 | 0.30 | 0.78 | 86.3 | 90.0 | 0.88 | 0.84 |
| | 6.1 | 88.7 | 91.6 | 0.28 | 0.78 | — | — | — | — |
| | 8.3 | 88.8 | 91.7 | 0.26 | 0.78 | 88.0 | 90.2 | 0.75 | 0.82 |
| | 12.2 | 89.1 | 91.9 | 0.24 | 0.78 | — | — | — | — |
| | 18.1 | 89.3 | 92.0 | 0.20 | 0.78 | 89.0 | 91.0 | 0.73 | 0.80 |
| 62 sec. | 0.64 | 83.4 | 88.8 | 0.90 | 0.84 | — | — | — | — |
| | 1.6 | 85.3 | 90.5 | 0.75 | 0.82 | 85.0 | 89.3 | 1.20 | 0.86 |
| | 2.3 | 86.1 | 90.8 | 0.57 | 0.84 | — | — | — | — |
| | 3.9 | 87.4 | 91.3 | 0.48 | 0.82 | 86.5 | 89.6 | 1.06 | 0.89 |
| | 6.1 | 88.1 | 91.5 | 0.36 | 0.82 | — | — | — | — |
| | 8.3 | 88.4 | 91.8 | 0.28 | 0.82 | 87.5 | 90.0 | 0.98 | 0.88 |
| | 12.2 | 89.1 | 92.1 | 0.31 | 0.82 | — | — | — | — |
| | 18.1 | 89.5 | 92.3 | 0.30 | 0.82 | 88.2 | 90.8 | 0.86 | 0.88 |
| 43 sec. | 0.64 | 83.1 | 89.2 | 1.10 | 0.82 | — | — | — | — |
| | 1.6 | 85.4 | 89.5 | 0.82 | 0.82 | 84.3 | 88.3 | 1.29 | 0.82 |
| | 2.3 | 86.5 | 90.5 | 0.78 | 0.80 | — | — | — | — |
| | 3.9 | 87.8 | 90.7 | 0.60 | 0.84 | 85.5 | 88.8 | 1.24 | 0.84 |
| | 6.1 | 88.2 | 90.8 | −.58 | 0.82 | — | — | — | — |
| | 8.3 | 88.2 | 90.9 | 0.56 | 0.82 | 86.5 | 89.2 | 1.10 | 0.86 |
| | 12.2 | 88.2 | 91.0 | 0.53 | 0.84 | — | — | — | — |
| | 18.1 | 88.0 | 91.2 | 0.48 | 0.84 | 87.9 | 90.0 | 0.99 | 0.84 |

Figure 4:
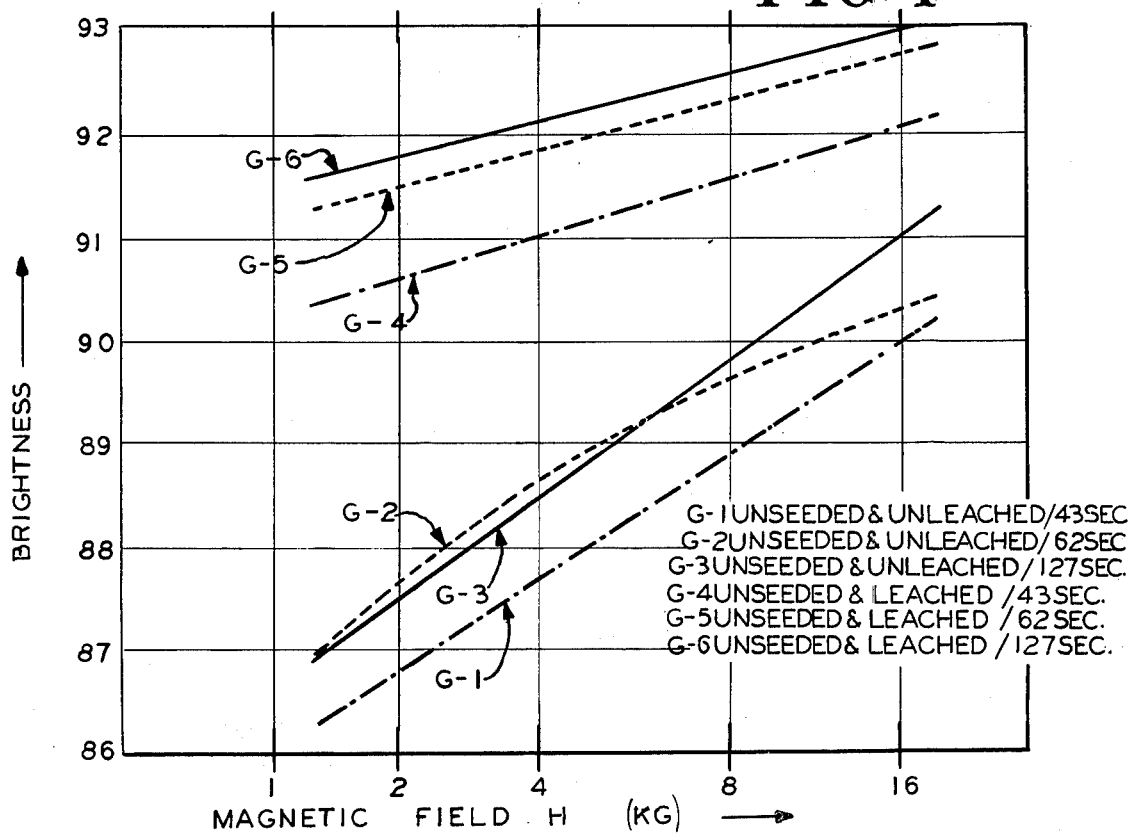
FIG. 4 is a graph depicting brightness improvements as a function of applied magnetic field for a further clay, which has been subjected to a magnetic separation by processes based on the invention.

In FIG. 4 the tabularized data is plotted for the clay G samples which were processed without use of the magnetic seeding particulate. The conditions represented by the six depicted curves are indicated in the legends provided on the Figure. Specifically, curves G-1, G-2 and G-3 illustrate brightnesses obtained without leaching for three different retention times, i.e. 43, 62 and 127 seconds; and the curves G-4, G-5 and G-6 illustrate the brightness results where leaching is utilized, and for the same retention times.

Figure 5:
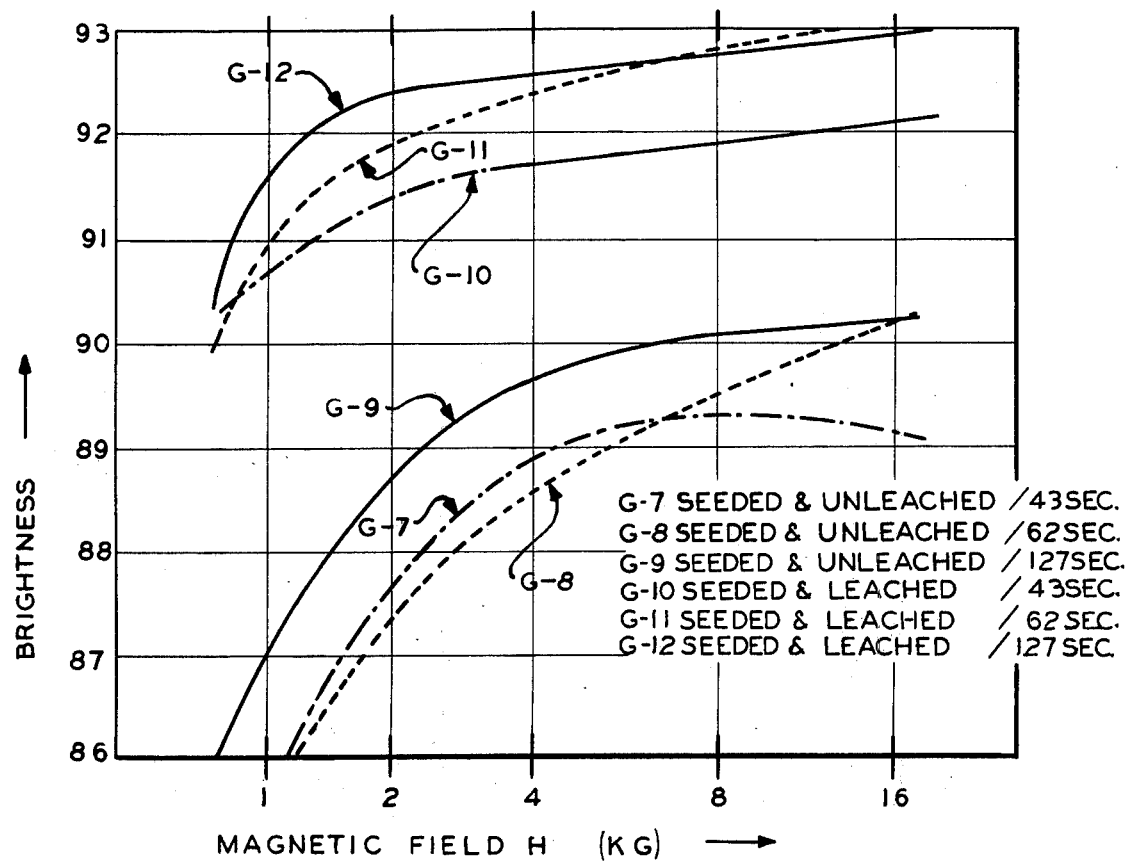
FIG. 5 is a graph setting forth comparison data for clays as in FIG. 4, which have, however, been subjected to magnetic separation without use of the present invention.

In FIG. 5 a series of six further curves are plotted, in all instances representing the tabularized data of Table XXII for the cases where samples of clay G have been processed with use of the magnetic seeding particulates of the present invention. Generally it will be noted upon comparing FIGS. 4 and 5, that the improvements provided by the invention are similar to those evidenced in connection with the showings of FIGS. 2 and 3 for the clay F samples — although the effect of retention times on clay brightness is more pronounced in the present data. Comparing FIGS. 4 and 5 further, it will especially be noted that the best brightnesses obtained without seeding (approximately 91.0) occurs utilizing a relatively very high field intensity of 18.1 kG; and that such 91.0 brightness is matched where seeding is used, at the exceedingly low field of 1.6 kG with a retention time of 127 seconds, and at 3.9 kG for a retention time of 62 seconds. The amazing brightness increases at other, very low field values, i.e. well below 3–4 kG, will be evident for all the curves G-10, G-11 and G-12 of FIG. 5.

EXAMPLE XXII

Again for purposes of comparison, several further samples of clay G were processed at a higher solids level, in this case at 30% solids w/w. The experimental conditions were otherwise as described in connection with the preceding Example XXI, with retention times of 62 and 127 seconds being utilized, and with total collection of 3200 ml of the magnetted slurry being effected. The resultant brightness data is set forth in Table XXIII hereinbelow.

Table XXIII

| Field KG | Retention Time 127 sec. Brightness | | Retention Time 62 sec. Brightness | |
|---|---|---|---|---|
| | Product | Leached | Product | Leached |
| 1.6 | 84.8 | 90.5 | 84.0 | 89.0 |
| 3.9 | 87.0 | 91.2 | 86.3 | 90.8 |
| 8.3 | 88.0 | 91.4 | 88.0 | 91.0 |
| 18.1 | 88.8 | 91.8 | 88.5 | 91.5 |

While the present invention has been particularly set forth in terms of specific embodiments thereof, it will be understood in view of the instant disclosure, that numerous variations upon the invention yet reside within the scope of the present teaching. Accordingly the invention is to be broadly construed, and limited only by the scope and spirit of the claims now appended hereto.

We claim:

1. A method for magnetically separating discoloring titaniferous contaminants of low magnetic attractability from a crude kaolin clay, comprising the steps of:

forming a dispersed aqueous slurry of said clay;

seeding said slurry with a particulate selected from one or more members of the group consisting of (1) a finely divided ferrimagnetic powder wherein at least 50% by weight of the particles thereof are of less than 30 microns E.S.D.; (2) an aqueous unpeptized precipitate of a magnetic ferrite, the particles of which are of predominantly colloidal size; and (3) an aqueous peptized precipitate of a magnetic ferrite, the particles of which are of predominantly colloidal size and are dispersed in a substantially entirely and uniformly aqueous phase; and subjecting the seeded slurry to a magnetic separation by passing said slurry through a porous ferromagnetic matrix positioned in a magnetic field having an intensity in the range of from about 0.5 to 5 kG, to remove said titaniferous contaminants seeded by said particulate.

2. A method in accordance with claim 1, wherein said particulate comprises ferroso-ferric oxide.

3. A method in accordance with claim 2, further including leaching the purified product from said magnetic separation, to remove leachable iron, including at least part of the remnants of said seeding particulate.

4. A method in accordance with claim 1, wherein said matrix comprises steel wool.

5. A method in accordance with claim 1, wherein said matrix comprises steel balls.

6. A method in accordance with claim 1, wherein said matrix comprises steel tacks.

7. A method in accordance with claim 1, wherein said particulate comprises a said powder of natural magnetite.

8. A method in accordance with claim 1, wherein the retention time of said slurry in said magnetic field is at least 15 seconds.

9. A method in accordance with claim 1, wherein said particulate comprises a magnetic ferrite.

10. A method in accordance with claim 1, wherein said particulate comprises a precipitate of $NiFe_2O_4$.

11. A method in accordance with claim 1, wherein said particulate comprises a precipitate of $CoFe_2O_4$.

* * * * *